United States Patent [19] [11] 4,119,597
Enoue [45] Oct. 10, 1978

[54] ADDITIVE TO BE ADMIXED TO CEMENTS

[76] Inventor: Takasi Enoue, No. 931, Takemachi, Kagoshim-shi, Kagoshima-ken, Japan

[21] Appl. No.: 739,834

[22] Filed: Nov. 8, 1976

[30] Foreign Application Priority Data

Nov. 13, 1975 [JP] Japan .................. 50/136541

[51] Int. Cl.$^2$ .............. C04B 7/02; C04B 7/355; C04B 13/24; C08L 29/04
[52] U.S. Cl. .................. 260/23 R; 106/90; 106/95; 260/23 EM; 260/29.6 S; 260/29.6 B; 260/29.6 PM
[58] Field of Search .......... 260/23 EM, 23 R, 29.6 S, 260/29.6 B, 29.6 PM; 106/90, 89, 95

[56] References Cited
U.S. PATENT DOCUMENTS

| | | | |
|---|---|---|---|
| 931,884 | 8/1909 | McCormick | 106/95 |
| 2,305,113 | 12/1942 | Scripture | 106/95 |
| 2,878,875 | 3/1959 | Dunlap et al. | 106/90 |
| 2,890,965 | 6/1959 | Underdown | 106/89 |
| 3,145,774 | 8/1964 | Patchen | 106/90 |
| 3,847,630 | 11/1964 | Compernass et al. | 106/90 |
| 3,885,985 | 5/1975 | Serafin et al. | 106/90 |
| 3,915,919 | 10/1975 | Nishioka et al. | 260/29.6 S |
| 3,997,674 | 12/1976 | Ukai et al. | 260/29.6 B |

*Primary Examiner*—Ronald W. Griffin
*Attorney, Agent, or Firm*—Toren, McGeady and Stanger

[57] ABSTRACT

An additive to be admixed to cements comprising a mixture of an aqueous solution (A) of polyvinyl alcohol resin which is prepared by mixing under agitation polyvinyl alcohol with at least one of aluminum sulfate and calcium hydroxide in water, and an aqueous dispersoid (B) which is prepared by dispersing vegetable oil or fat in water in the presence of a dispersing agent.

4 Claims, 1 Drawing Figure

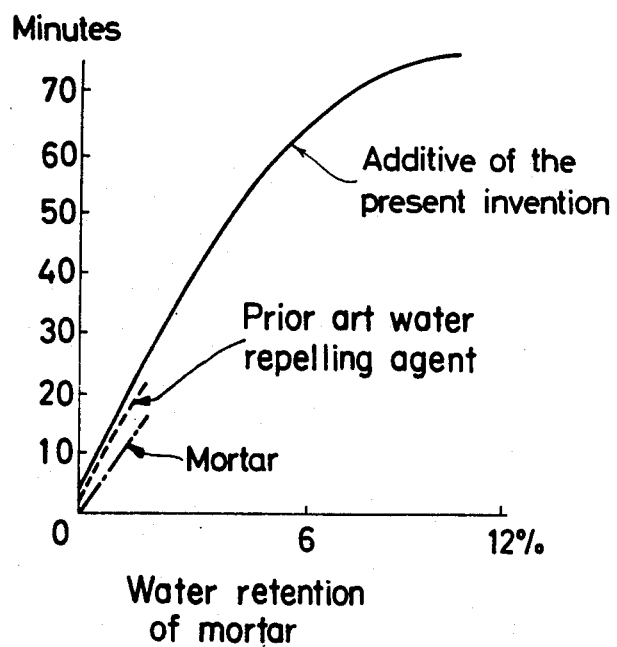

ADDITIVE TO BE ADMIXED TO CEMENTS

BACKGROUND OF THE INVENTION

1. Field of the Invention

The present invention relates to an additive to be admixed to cements. More particularly, this invention provides an additive which, when added to cement, is capable of producing non-shrinking property, high strength, adhesive property, water-repelling property, resistance to chemicals, corrosion resistance, and abrasion resistance.

2. Description of Prior Art

Although various known additives (water-repellant) of previous use could produce high quality water-repelling cement paste mortars when they are mixed with cement, none of them can produce non-shrinking and adhesive properties, high strength, resistance to chemicals, corrosion and abrasion resistance, higher water repelling property, and further a property to prevent efflorescene due to calcium hydroxide contained in the cement in the practical use.

SUMMARY OF THE INVENTION

The present invention relates to an additive for cement in which a polyvinyl alcohol is utilized. The invention is characterized by mixing under agitation an aqueous solution of a polyvinyl alcohol resin and aluminum sulfate or calcium hydroxide with an aqueous dispersoid which is prepared from a vegetable oil or fat and a dispersing agent and dispersed in fresh water. More particularly, this invention relates to an aqueous dispersoid of polyvinyl alcohol (designate hereinafter as PVA) produced by mixing under agitation an aqueous PVA resin solution (A), which is prepared by mixing PVA, aluminum sulfate or calcium hydroxide, and water, with an aqueous dispersoid (B) of vegetable oil or fat made with a dispersing agent. The resulting mixture is diluted with water when it is used, and is added to portland cement.

The additive of the present invention is for cement used to give remarkable properties without interfering with the dispersing property of cement.

The additive of this invention (aqueous PVA resin dispersoid) is added to cement or to a mixture of cement and aggregates, if necessary.

Concrete and mortar of high quality can be obtained by mixing the additive of this invention to cement. Thus, the concrete or mortar having high strength, and of non-shrinking, high adhesive and water-repelling properties can be produced from cement, aggregates, water, and the additive by milling them and applying necessary cure. The product is also provided with water repelling property and resistance against abrasion, chemicals and corrosion.

The additive of the present invention (an aqueous PVA resin dispersoid), when mixed with portland cement and water, produces a cement paste mortar having better dispersing property, suppresses delay of hardening and evolution of heat, and provides water-retaining property, and thus exhibits better results in curing concrete mortar, especially in the improved initial strength. Increase in the quantity of aluminum sulfate or vegetable oil or fat in the additive of this invention results in achieving rapid hardening, so that produced concrete or mortar sooner attains high compression strength. Concrete is generally produced by mixing cement, aggregates, and water before being hardened, and a necessary level of compression strength is only obtained in 3–4 weeks. Therefore, when a shorter period is required for the secondary products of concrete or raw concrete before they are hardened, either a rapid-hardening cement is used, or a particular way of curing is applied depending on circumstances.

The apparent disadvantages of these processes are a large scale of area and installation needed and difficulties in quality control.

The present invention provides an additive for cement which has eliminated above difficulties and has excellent characteristics. It requires no large area nor installation, and it is free from difficulties arising from rapid-hardening and quality control. It also provides production of rapid-hardening and high compression strength concrete and also the process thereof to be employed by using ordinary installation.

In the practical application of the additive of this invention (aqueous PVA resin dispersoid), it is mixed with portland cement and aggregates, if necessary, and the resulting mixture is milled and molded in a desired shape, and then cured in a certain way, to obtain high strength concrete products such as tubes and stakes of concrete.

Furthermore the additive of this invention is also capable of producing non-shrinking, water-proof and water-repelling property, resistance against abrasion and chemicals and of improving strength of adhesion, as well as of improving strength of portland cement.

Predominant improvement has been observed in the enhanced shear strength of reinforced cement and mortar and also in the rust-preventing property, when the additive of this invention (aqueous dispersoid of PVA resin) is mixed with portland cement.

Since the additive of the present invention (aqueous dispersoid of PVA resin) can be produced in a simple process, or by only agitating in a simple apparatus, it can be produced cheaply in a large scale without provoking any pollution problem.

DETAILED DESCRIPTION OF THE INVENTION

In the next place mention will be given in detail with the compounds to be used in this invention. PVA should be ordinary commercial one having 300–2500 of degree of polymerization and 70–100 molar percent of degree of saponification. PVA is preferably used in the form of a 3–30% aqueous solution. In this invention a wide variety of PVA are used with success regardless of their degree of polymerization. A degree of saponification exceeding 70% is preferred for the PVA used.

Solubility in water of the PVA themselves varies with the degrees of saponification. However, when an additive (aqueous dispersoid of PVA resin) prepared in the process of this invention by use of PVA having a degree of saponification is mixed with cement, unexpectedly high water repelling property can be produced. Thus, it is concluded that PVA of wide variety of degree of saponification could be employed without difficulties.

Compounds to be added to PVA include aluminum sulfate and calcium hydroxide. The amount of aluminum sulfate or calcium hydroxide to be applied for the purpose depends on the degree of polymerization and concentration of the PVA and the desired level of viscosity of resulting solution.

Further, viscosity of the additive (aqueous dispersoid of PVA resin) can be varied as desired by adjusting the amount of aluminum sulfate or calcium hydroxide to be added.

The amount of aluminum sulfate and calcium hydroxide to be added is preferably 0.1–300% to PVA. Both compounds, aluminum sulfate and calcium hydroxide, should well be added in the form of aqueous solution to the aqueous solution of PVA. Since foams may be formed on mixing, an antifoaming agent must be present. It suffices for an antifoaming agent such as silicone and tributyl phosphate to be added in the range of 0.01–0.5% to PVA. The resulting solution should be thoroughly mixed with and dispersed in an aqueous solution of aluminum sulfate or calcium hydroxide and then kept standing for at least 24 hours before the mixture is mixed with the dispersoid (B), or otherwise satisfactory results would not be obtained.

As for the proportion of the aqueous solution (A) to the aqueous dispersoid (B), 60 to 70 parts by weight of the solution (A) to 30 to 40 parts by weight of a dispersoid (B) is preferable.

On the other hand, polyalkylarylsulfonates are especially suitable to dispersing agent to be added to the solution (B) and preferably one part of it is added to 0.01–0.3 part by weight of vegetable oil or fat.

Suitable dispersing agent to be added to vegetable oil or fat is soybean oil; for example, preferably 0.01–0.3 part of soybean oil is added to one part of the dispersing agent. Desired performance could not be exhibited outside the range indicated.

To a thorough mixture of the dispersing agent and the vegetable oil or fat, fresh water is added to the amount 0.5–3 parts by weight to one part of the dispersing agent. The resulting aqueous dispersoid (B) should not be used immediately after mixing to obtain high quality of products, but it is kept standing for at least 24 hours before it is mixed with the aqueous solution of PVA resin (A). On mixing (A) and (B) the resulting mixture should be further allowed to stand for about 20 hours to obtain high quality mixture, or aqueous dispersoid of PVA resin. The additive of this invention, or the aqueous dispersoid of PVA resin, is diluted with water to obtain a dilute aqueous dispersoid of PVA resin. By adding this to cement, paste mortar produced from it aquires excellent fluidity, adequate viscosity, caking property and adhesive force, as well as water repelling property. The compression and bending strengths are improved to a great extent. The tensile, cracking and dynamic strengths and also resistance of products against abrasion, chemicals and corrosion are obtained without losing characteristic properties of the dispersing agent. The excellent dispersing ability of the dispersing agent permits to produce high fluidity regardless of the low W/C ratio. The amount of water to be added to cement can be reduced by 10–20% by weight to cement.

Furthermore, owing to the water repelling property obtained, strong resistance against water, chemicals, alkalis and acids is efficiently produced.

It has been ascertained that the additive of the present invention is useful to produce excellent quality of concrete because separation of aggregates in the concrete that may likely occur with usual concretes can be prevented owing to the more increased viscosity than in usual concretes.

The additive of this invention is useful to provide delayed coagulation, controlled heat (or temperature) of hydration of cement, and water retaining property. More particularly, adhesion between cement particles and aggregates is strengthened, which results in remarkable increase in the strength against compression, bending and stretching, and the effect of preventing crack formation of concrete is markedly exhibited as the synergistic effect with cement. Improvement of the resistance against alkalis results in preventing calcium hydroxide in the cement from forming efflorescence. The additive of this invention can combine with water in the cement, to increase the viscosity of the cement paste itself and to prevent free water in the cement from coming out as well as to make breezing and rapid evaporation of water, which is effective to thoroughly hydrate the concrete and mortar.

Especially predominant features of this additive are to produce high strength in the earlier stage, water repelling property with no permeability to water and improved strength of adhesion.

As has been described above, the additive of this invention (aqueous dispersoid of PVA resin) can be applied to any portland cements, which include ordinary cement, rapid setting cement, white cement, blast furnace cement, and fly ash cement. The additive of this invention can also be used to a viriety of powders of inorganic materials which are utilized to material for construction and architecture such as gypsum, calcium carbonate, dolomite plaster, and clay.

When it is desired to control coagulation of cement or to achieve high strength in an earlier stage, or when a secondary product from concrete is involved, the amount of aluminum sulfate and vegetable oil or fat to be added should be controlled to attain the desired aim.

The fact that the additive of the present invention exhibits these excellent results can not be ascribed to mere presence of PVA, aluminum sulfate, and calcium hydroxide, but should be explained from the cooperative function of PVA, aluminum sulfate, calcium hydroxide and water exhibited with the aqueous dispersoid which is composed of the dispersing agent, vegetable oil or fat and water.

The concentration and the viscosity of the additive of this invention (aqueous dispersoid of PVA resin) may be freely varied depending on what the additive is used for by changing the proportions of components in the aqueous solution of the PVA resin, (A), and the aqueous dispersoid, (B).

A mortar and a concrete to which the additive of this invention has been admixed, which has high adhesive property, can be applied on a surface of asphalt, a composite from asphalt and rubber, and further onto wood and a laminated board.

The aqueous dispersoid of PVA resin of this invention is so stable enough as to be kept for a whole year at the room temperature without leading to separation nor gelation.

As has been described in detail, the aqueous solution of PVA resin, solution (A), is produced by mixing an aqueous 3–30% solution of PVA, aluminum sulfate or calcium hydroxide in the amount 0.1–300% by weight to the PVA and an antifoaming agent in the amount 0.01–0.5% by weight to the PVA, agitating thoroughly, and allowing to stand at least for 24 hours until it becomes viscous.

On the other hand, an aqueous dispersoid, (B), of high quality is produced by mixing one part of dispersing agent, 0.01–0.3 part by weight of vegetable oil or fat thoroughly, followed by adding 0.5–3 part of fresh water, thoroughly mixing and allowing to stand for at least 24 hours.

Mixing and thorough stirring of the aqueous solution of PVA resin (A) and the aqueous dispersoid (B) followed by standing for at least 20 hours results in forming a viscous liquid additive (aqueous dispersoid of PVA resin), which contains 4–31% of non-aqueous matters and the viscosity of which is 450–30000 cp at 20° C.

In average, the additive of this invention (aqueous dispersoid of PVA resin) is applied to portland cement in the proportion of 6–18% by weight to the latter.

When shrinking should be prevented intentionally, a proportion between 6–18% by weight is desirable, while addition of less than 6% by weight is not sufficient to exhibit non-shrinking and other properties.

The present invention will be more clearly understood from the following examples in reference to the attached drawing.

BRIEF EXPLANATION OF THE DRAWING

The attached drawing is a graph showing water retaining property of the mortar which is prepared using the additive of the present invention.

DESCRIPTION OF PREFERRED EMBODIMENT

EXAMPLE 1

In a dissolution tank were placed 12 parts of a 6.25% aqueous solution of PVA 205 (degree of polymerization of 550 and degree of saponification of 88 molar %, supplied by Kurashiki Rayon Co.) and 0.10 part of 10% aqueous solution of aluminum sulfate. The mixture was thoroughly mixed and 0.002 part of silicone (Silicone KM 73, antifoaming agent supplied by Shinetsu Chemicals Industry). The whole mixture was agitated for 1 hour and kept standing for further 24 hours, to obtain 12.102 parts of an aqueous solution of PVA resin (A).

On the other hand, in a separate dissolution tank 3 parts of polyalkylarylsulfonate (dispersing agent) and 0.1 part of soybean oil were mixed and agitated for 30 minutes, which was mixed with 2.798 parts of fresh water. The resulting mixture was thoroughly mixed to secure complete dispersion, to obtain 5.898 parts of an aqueous dispersoid, which was allowed to stand for 24 hours. Thoroughly mixing the aqueous solution of PVA resin (A) (12.102 parts) and the aqueous dispersoid (B) (5.898 parts) followed by 20 hours standing gave 18 parts of a viscous additive (aqueous dispersoid of PVA resin) of ocher color, of which the viscosity was 1200 cp at 20° C.

The resulting product was mixed with portland cement in the amount of 6% to the latter to make mortar of composite cement, of which coagulation strength, shrinkage ratio and water repelling property were estimated according to the methods in JIS-R5201, JIS-A1404. Results are shown in Tables 1, 2, 3 and 4.

Table 1

| | Coagulation | | |
|---|---|---|---|
| | According to this invention | With a conventional water repelling agent | With only portland cement |
| Water content (%) | 26.0 | 26.0 | 26.0 |
| Initiation of Evolution (Hours-minutes) | 5 – 10 | 2 – 30 | 2 – 39 |
| Termination of Evolution (Hours-minutes) | 7 – 30 | 3 – 40 | 3 – 41 |

Table 2

| Lapse of Time (day) | Strength | | | | | |
|---|---|---|---|---|---|---|
| | Compression (kg/cm$^2$) | | | Bending (kg/cm$^2$) | | |
| | Present Invention | Previous Product | Portland Cement | Present Invention | Previous Product | Portland Cement |
| 3 | 180 | 106 | 110 | 38.0 | 26.8 | 28.0 |
| 7 | 288 | 180 | 206 | 60.0 | 40.1 | 42.0 |
| 28 | 438 | 310 | 358 | 88.0 | 61.0 | 68.8 |

Table 3

| | Shrinkage ratio | | |
|---|---|---|---|
| | Cured sample air-dried in 50% RH at 20° C | | |
| Lapse of time (day) | Present Invention | Previous Product | Portland Cement |
| 3 | 13.0 | 17.2 | 22.8 |
| 8 | 18.4 | 33.8 | 37.0 |
| 21 | 23.0 | 38.0 | 46.5 |
| 28 | 25.1 | 42.0 | 54.3 |

Table 3 reveals that the shrinkage ratio of this invention is better than that of previous products.

Table 4

| Water repelling property | | |
|---|---|---|
| Water Permeability Ratio | | |
| Present Invention | Previous Product | Portland Cement |
| 0.20 | 0.56 | 1.00 |

The drawing attached shows the water retaining property of the mortar which has been prepared using the additive of the present invention obtained in a process as indicated in Example 1.

Testing procedure:

A coagulation testing apparatus in accordance with HIS-R5201 was employed. A needle with 3 mm diameter was applied on samples with a load of about 300 g and the time in which the needle-top came to 3 mm below the surface of mortar was measured. Samples were prepared by applying each mortar (cement:sand = 1:3) on a slate board of 5 mm thickness.

EXAMPLE 2

To 12 parts of a 3.0% aqueous solution of PVA 205 (degree of polymerization of 550 and degree of saponification of 88 molar %, supplied by Kurashiki Rayon Co.), 0.9 part of a 60% aqueous solution of aluminum sulfate and then 0.002 part of silicone as antifoaming agent (Silicone KM 73 supplied by Shinetsu Chemicals Industry). The whole mixture was thoroughly mixed for an hour and kept standing for 24 hours to obtain 12.902 parts of an aqueous solution of PVA resin (A).

In a separate dissolution tank 3 parts of polyalkylarylsulfonate (as dispersing agent) and 0.1 part of soybean oil were mixed together for 30 minutes. To the resulting mixture 1.998 parts of fresh water was added to obtain 5.098 parts of a thoroughly dispersed aqueous dispersoid (B) which was allowed to stand for 24 hours.

Mixing 12.902 parts of the aqueous solution of PVA resin (A) and 5.098 parts of the aqueous dispersoid (B) and thoroughly agitating the resulting mixture followed by standing for 20 hours gave 18 parts of a highly viscous additive (aqueous dispersoid of PVA resin) of which the viscosity was 1,600 cp at 20° C.

The above product was admixed to portland cement 500Kg by 6% by weight. Compression strength greater than 600–700 kg/cm$^2$ was obtained in 5–7 days after the concrete was made from. This is in contrast to compression of 400–500 kg/cm² which is only attained in 28 days with previous concretes.

The additive of this invention has succeeded in extending strength of previous concretes to a large extent. When a mortar was prepared from cement and the additive of this invention which had been produced in Example 2 and was applied to asphalt and laminated boards, excellent results were obtained with the initial strength and adhesive property, and no change was observed when exposed to weather for a long period without any cracking, swelling and peeling.

EXAMPLE 3

Experiments were performed to test the shrinkage ratio of a concrete which had been produced by adding the additive of this invention obtained in Example 1 to portland cement by 6% by weight. Results are shown in Table 5.

Table 5

| Additive | Compression strength (kg/cm²) | | | Shrinkage in 8 weeks ($\times 10^{-4}$) |
|---|---|---|---|---|
| | In 3 days | In 7 days | In 28 days | |
| No | 79 | 131 | 246 | 7.04 |
| This Invention (by 6%) | 101 | 171 | 318 | 4.20 |

The test as shown in Table 5 revealed that use of the additive of this invention could reduce the shrinkage of concrete approximately by 40%.

EXAMPLE 4

Effect of various additives on crack prevention of concrete was examined, compositions of the concretes are indicated in Table 6. To portland cement, 6% by weight of the additive of this invention was used, and each 3% by weight of other additives, that is aliphatic acid, water glass, and stearic acid type additives was applied. Results are seen in Table 6.

Table 6

| Additive | Slump | Water (kg/m³) | Cement (kg/m³) | Amount of Additive (kg) | Sand (kg/m³) | Pebble (kg/m³) | Lapse of time before crack-formation (day) |
|---|---|---|---|---|---|---|---|
| None | 19.0 | 195 | 300 | 0 | 901 | 969 | 7 |
| Aliphatic Acid Type | 19.0 | 186 | 300 | 9 | 901 | 969 | 8 |
| Water Glass Type | 19.0 | 186 | 300 | 9 | 901 | 969 | 8 |
| Stearic Acid Type | 19.0 | 186 | 300 | 9 | 901 | 969 | 8 |
| Present Invention | 19.0 | 162 | 300 | 18 | 901 | 969 | 80 |

Granules of sand and pebbles were smaller than 5 and 25 mm, respectively, in diameter.

The tests shown in Table 6 were conducted as below. Each concrete specimen was 1 m long with a cross-section 16 × 8 cm on each end having a narrow part at the middle with a cross-section 8 × 8 cm. Either end of the specimen was fixed with a bolt to a frame of copper to restrict shrinkage of the concrete. The lapse of time in which cracks were formed on the concrete specimens were measured. The tests were carried out in a closed room where the temperature was maintained at 20° C. and the humidity at 45%.

Cracks are formed in much more days for the concrete to which the additive of this invention has been added than for concretes otherwise prepared. Consequently, it has been ascertained that the former concrete does not crack theoretically when used in ordinary construction.

EXAMPLE 5

An experiment was carried out to determine whether or not calcium hydroxide was leached from a constructed body of concrete to which the additive of this invention prepared in Example 1 had been admixed. Thus, water tanks were constructed with the additive of this invention, and filled with water immediately after they were made. Measurement of pH revealed that the waters remained almost neutral or at pH 7.2–7.4 which was quite the same as that of the tap water. Detail of the results is shown in Table 7.

Table 7

Test of water kept in a tank which is made of concrete containing the additive of the present invention

| Tank | Amount of water (tons) | pH value | Institution |
|---|---|---|---|
| Water acceptor tank | 500 | 7.2 | A water administration station |
| Water tank | 1000 | 7.4 | B water administration station |
| Water reservoir | 8000 | 7.4 | C water administration station |

EXAMPLE 6

Resistance to chemicals was examined with a mortar which contained 6% by weight of the additive of this invention prepared in Example in portland cement. Results are shown in Table 8.

Table 8

| Additive | Chemical | 1N Sulfuric acid | 1N Hydrochloric acid |
|---|---|---|---|
| Reference example 1 Aliphatic acid type | | −9.6% | −15.3% |
| Reference example 2 Water glass type | | −9.3% | −15.0% |
| Reference example 3 Stearic acid type | | −9.4% | −15.1% |
| Present Invention | | −2.6% | −3.8% |

The test was carried out according to ASTM-C-267 (test for chemical resistance); immersion for 7 days.

EXAMPLE 7

In a dissolution tank, a mixture consisting of 12 parts of a 25% aqueous solution of PVA 205 (degree of polymerization 550, degree of saponification 88 molar %, supplied by Kurashiki Rayon Co.) and 0.1 part of a 10% aqueous solution of aluminum sulfate was thoroughly mixed by agitating for 1 hour, to which further 0.010 part of silicone (antifoaming agent, Silicone KM73 supplied by Shinetsu Chemicals Industry) was added and stirred to complete uniformity. The resulting mixture was stand still for 24 hours to obtain 12.11 parts of an aqueous solution of PVA resin (A).

In a separate dissolution tank, 3 parts of polyalkylarylsulfonate (dispersing agent) and 0.3 parts of soybean oil were mixed and agitated for 30 minutes, to the resulting mixture of which further 2.59 parts of fresh water was added and thoroughly stirred to complete dispersion, to obtain 5.89 parts of an aqueous dispersoid (B) which was allowed to stand for 24 hours.

The aqueous solution of PVA resin (A), 12.11 parts, and the aqueous dispersoid (B), 5.89 parts, were thoroughly mixed and kept standing for 20 hours, to obtain 18 parts of a viscous additive (aqueous dispersoid of:- PVA resin) of which the viscosity was 2200 cp at 20° C.

The prepared additive was mixed to portland cement by 10% by weight. The resulting mortar (ratio of cement to sand = 1:3 by weight) was submitted to the bending adhesion strength tests according to JIS-R5201. Results are indicated in Table 9.

Table 9

| | (Figures indicate mean values) | |
|---|---|---|
| | Adhesion strength (kg/cm$^2$) | |
| Additive | 7 days | 28 days |
| Reference example 1 Aliphatic acid type | 5.1 | 5.5 |
| Reference example 2 Water glass type | 5.3 | 5.1 |
| Reference example 3 Stearic acid type | 5.22 | 5.8 |
| Present Invention | 18.8 | 31.6 |

EXAMPLE 8

Abrasion test was carried out with a mixed material of cement and mortar (cement:sand = 1:3 and lapse of time W4) in which the additive of this invention prepared in Example 1 had been added to the cement by 6% by weight. Results are seen in Table 10.

Table 10

| | Abrasion | | |
|---|---|---|---|
| Additive | 1 | 2 | mean |
| Reference example 1 Aliphatic acid type | 15.0 | 17.1 | 16.05 |
| Reference example 2 Water glass type | 15.3 | 16.8 | 16.05 |
| Reference example 3 Stearic acid type | 15.5 | 17.8 | 16.6 |
| Present Invention | 5.22 | 5.36 | 5.29 |

The test above was carried out according to the abrasion test of woody materials as specified in JIS; blowing continued for 3 minutes with compressed air of 2 kg/cm$^2$ to 40 kg/mm and the extent of abrasion was estimated from the difference in weight between before and after the blowing.

As has been shown in examples, the additive of the present invention exhibits predominant performances; improvement in the water repelling property about 3–4 times as higher, in the compression strength about 1.3 times, in the bending strength about 1.4 times, and in the adhesive strength about 6 times as stronger as those of previous products. Further, improvement is also in the tensile strength. The additive is also complete in preventing cracks, superior in resistance against chemicals and abrasion, and prevents formation of efflorescence from cement. None of the previous additives can exhibit comparable effect. Therefore, it is concluded that the material proposed constitutes highly useful invention to be employed in industry.

What is claimed is:

1. An additive to be admixed to cements comprising a mixture of an aqueous solution (A) of polyvinylalcohol resin which is prepared by mixing, under agitation, polyvinyl alcohol resin with at least one of aluminum sulfate and calcium hydroxide in water, and an aqueous dispersoid (B) which is prepared by dispersing vegetable oil or fat in water in the presence of a dispersing agent.

2. An additive according to claim 1, in which the aqueous solution (A) is prepared by mixing the polyvinylalcohol resin with 0.1 to 50% by weight of at least one of aluminum sulfate and calcium hydroxide on the basis of the polyvinyl alcohol.

3. An additive according to claim 1, in which the aqueous dispersoid (B) is prepared by dispersing 0.01 to 0.3 part by weight of oil in 1 part by weight of polyalkylarylsulfonate.

4. An additive according to claim 1, in which the proportion of the aqueous solution (A) to the aqueous solution (B) is from 60 to 70 parts by weight to 30 to 40 parts by weight of the aqueous solution (B).

* * * * *